Dec. 12, 1933.  J. KLEIN  1,939,061
AIRPLANE
Filed Dec. 29, 1931
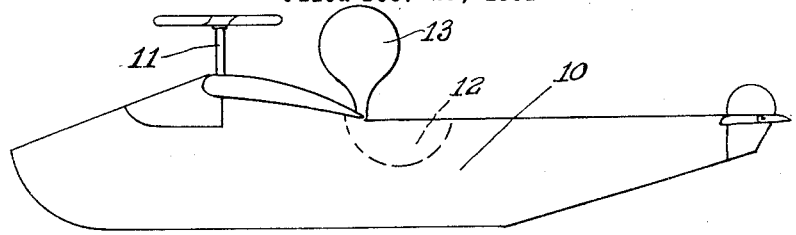
Fig. 1
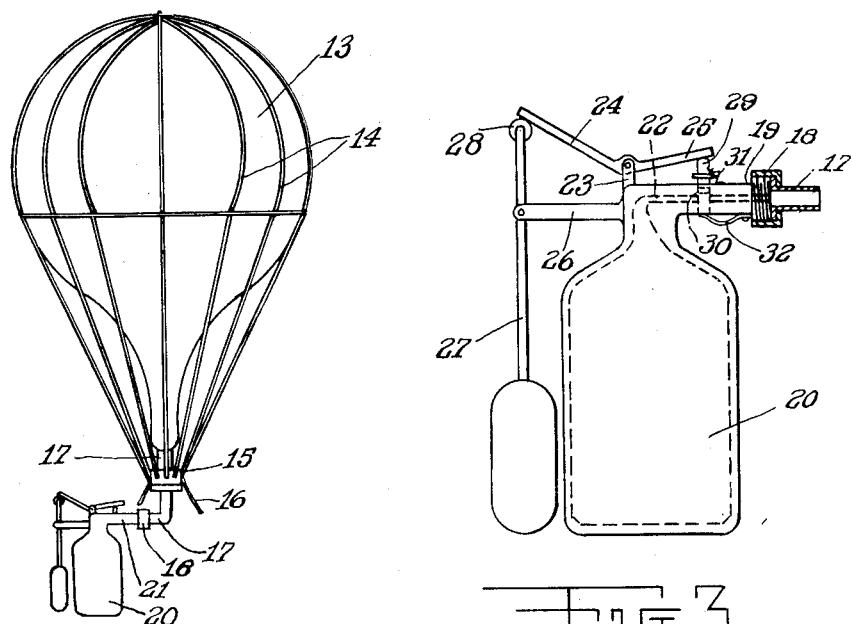
Fig. 2
Fig. 3
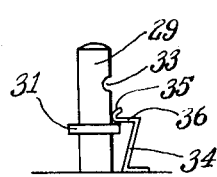
Fig. 5
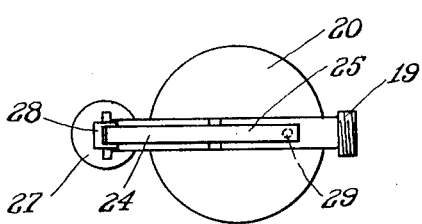
Fig. 4
INVENTOR
J. Klein
BY his ATTORNEY J. Ledermann Patented Dec. 12, 1933

1,939,061

UNITED STATES PATENT OFFICE 1,939,061

AIRPLANE

Jakob Klein, New York, N. Y., assignor of fifty percent to Max Backer, New York, N. Y.

Application December 29, 1931
Serial No. 583,675

4 Claims. (Cl. 244—21)

The main object of this invention is the provision of an inflatable parachute permanently secured to the fuselage of an airplane, by means of which the plane may be safely landed in case it goes into a nose dive.

Another object of the invention is the provision of an inflatable parachute for airplanes in combination with a tank or flask containing lifting gas in compressed form, the latter having pendulum-operated means for releasing the gas into the parachute whenever the angle of inclination of the plane becomes excessive, as in the case of a nose dive.

Still another object of the invention is the provision of a device such as mentioned, with means on the compressed gas holding flask for keeping the valve from the flask open after it has once been opened, so that the parachute will be fully inflated after the plane has entered into a nose dive, regardless whether the plane subsequently changes its angle.

The above and other objects will become apparent in the description below, in which characters of reference refer to like-named characters in the drawing.

Referring briefly to the drawing, Fig. 1 is a side elevational view of one type of airplane equipped with this device, showing the parachute partly inflated.

Fig. 2 is a view showing the relation between the parachute and the flask containing the compressed gas.

Fig. 3 is an enlarged elevational view of the flask, showing the pendulum-operated valve.

Fig. 4 is a plan view of Fig. 5.

Fig. 5 is an enlarged fragmentary view of the flask, showing the mechanism for keeping the valve open after it has once been opened.

Referring in detail to the drawing, the numeral 10 represents the fuselage of a helicopter type of hydroplane having a horizontal propeller 11. In a compartment 12 in the fuselage, at about the center of gravity of the plane, a balloon 13 is normally stored in deflated condition. This balloon comprises a gas bag of usual construction contained within a network of cords or the like 14 whose ends are attached to a ring 15. From this ring cables 16 branch and are attached to the fuselage, in such manner that the center of the ring 15 lies above the center of gravity of the plane.

A tube 17 leads from the nipple of the bag of the balloon 13, and is secured to the mouth of the flask 20 by means of a coupling ring 18 threadably engaging the threaded mouth 19 of the flask. A channel 22 passes through the neck 21 of the flask into the interior thereof. A standard 23 projects upwardly from the flask, and on the end thereof is pivotally mounted the elbow of a bell crank having arms 24 and 25. A horizontal bracket 26 extends from the flask, and on its end a pendulum 27 is pivoted intermediate the length of the latter. The upper end of the pendulum is provided with a roller adapted to ride on the underside of the arm 24.

A pin 29 is slidably mounted in a bore passing vertically through the neck 21 of the flask and through the channel 22. A plunger effect is attained by this pin during motion in this bore. An opening 30 is provided in the pin 29 intermediate its length, and when the pin is in such vertical position that this opening aligns with the channel 22, the valve is open and gas may pass from the flask. Ears 31 are provided on the pin 29 to limit the downward movement of the latter so that the opening 30 may not pass below the channel 22. A looped spring 32 fixed to the neck 21 normally presses against the lower end of the pin 29 and urges it upward so that the opening 30 normally lies above the channel 22 and the valve is therefore normally closed. A niche or groove 33 is cut in one side of the stem 29, and a spring 34 having an angular-shaped tongue 35 on its end, is secured to the upper side of the neck 21 with the tongue 35 being urged against the stem 29. At the same time, the lower flat edge 36 of this tongue lies against one of the ears 31, so that the pin 29 is prevented from rising far above its normal position indicated in Fig. 3. When the pin 29 has been depressed to its lowermost position, that is, to the position where further depression is prevented by contact of the ears 31 with the neck, then the groove 33 will have fallen to the vertical level of the tongue 35, and the latter will be urged into the groove, thus preventing the pin from again rising out of this position.

In operation, while the plane is in horizontal position or in such position inclined to the horizontal as a plane must necessarily assume in maneuvering, the pendulum 21 will remain vertical, or its departures from vertical position will be insufficient to bring the opening 30 down to the level of the channel 22. If, however, the plane should go into a nose dive, the angle between the pendulum and the flask, the latter being in fixed position in the fuselage, will increase, in which case the roller 28 will move to the right (Fig. 3), thus causing the arm 25 to depress the pin 29 into its lowermost position, in which the pin will then remain, as above-described. The gas then expands in the flask and flows into the balloon through the channel 22 and tube 17, thus inflating the balloon, which is of sufficient capacity to carry the plane in the gradual descent of the latter.

I claim:

1. In combination with a deflated balloon attached to an airplane, a flask or the like containing lifting gas under pressure, a tube connecting said flask with said balloon, a valve in said flask, means normally retaining said valve in closed position, a bell crank pivoted to said flask, a pendulum pivotally mounted on said flask, one arm of said bell crank lying in contact with said pendulum, the other arm of said bell crank lying in contact with said valve, said pendulum tilting said bell crank and causing the latter to open said valve when the plane goes into a nose dive.

2. In combination with a deflated balloon attached to an airplane, a flask or the like containing lifting gas under pressure, a tube connecting said flask with said balloon, a valve in said flask, means normally retaining said valve in closed position, a bell crank pivoted to said flask, a pendulum pivotally mounted on said flask, one arm of said bell crank lying in contact with said pendulum, the other arm of said bell crank lying in contact with said valve, said pendulum tilting said bell crank and causing the latter to open said valve when the plane goes into a nose dive, and means for retaining said valve in open position thereafter.

3. In combination with a deflated balloon attached to an airplane, a flask or the like containing lifting gas under pressure, means connecting said flask with said balloon, means for opening said valve when the plane goes into a nose dive, and means for keeping said valve open thereafter comprising a stem on said valve, said stem having a groove therein, a resilient member attached to said flask and having a tongue normally urged against said stem, said tongue registering in said groove when said valve is open and preventing withdrawal of said stem from said position.

4. In combination with a deflated balloon attached to an airplane, means on said plane for containing lifting gas under pressure, means connecting said gas-containing means with said balloon, a valve in said last-named means, means for opening said valve when the plane goes into a nose dive comprising a bell crank connected to said valve and a pendulum lying in contact with said crank, and means for keeping said valve open thereafter.

JAKOB KLEIN.